(12) United States Patent
Henry et al.

(10) Patent No.: US 10,165,296 B2
(45) Date of Patent: Dec. 25, 2018

(54) METHOD OF CODING AND DECODING IMAGES, DEVICE FOR CODING AND DECODING COMPUTER PROGRAMS CORRESPONDING THERETO

(71) Applicant: ORANGE, Paris (FR)

(72) Inventors: Felix Henry, Saint Gregoire (FR); Gordon Clare, Pace (FR)

(73) Assignee: ORANGE, Paris (FR)

( * ) Notice: Subject to any disclaimer, the term of this patent is extended or adjusted under 35 U.S.C. 154(b) by 455 days.

(21) Appl. No.: 14/649,868

(22) PCT Filed: Dec. 13, 2013

(86) PCT No.: PCT/FR2013/053062
§ 371 (c)(1),
(2) Date: Jun. 4, 2015

(87) PCT Pub. No.: WO2014/096637
PCT Pub. Date: Jun. 26, 2014

(65) Prior Publication Data
US 2015/0319451 A1 Nov. 5, 2015

(30) Foreign Application Priority Data
Dec. 17, 2012 (FR) ...................... 12 62119

(51) Int. Cl.
*H04N 19/00* (2014.01)
*H04N 19/50* (2014.01)
(Continued)

(52) U.S. Cl.
CPC ........... *H04N 19/50* (2014.11); *H04N 19/124* (2014.11); *H04N 19/13* (2014.11); *H04N 19/174* (2014.11);
(Continued)

(58) Field of Classification Search
CPC ........... H04N 7/12; H04N 19/50; H04N 19/00
See application file for complete search history.

(56) References Cited

U.S. PATENT DOCUMENTS

2012/0114034 A1* 5/2012 Huang ................... H04N 19/70
375/240.03
2013/0027230 A1* 1/2013 Marpe ................. H03M 7/4006
341/107

OTHER PUBLICATIONS

Gordon et al., "Wavefront Parallel Processing for HEVC Encoding and Decoding", 6. JCT-VC Meeting ;97, MPEG Meeting; Jul. 14, 2011, Torinto, XP0300009297.
(Continued)

*Primary Examiner* — Maryam A Nasri
(74) *Attorney, Agent, or Firm* — Haverstock & Owens LLP

(57) ABSTRACT

A method of coding an image comprising the steps of partitioning (C1, C2) the image into a plurality of blocks (CTU1, CTU2, . . . , CTUi, . . . , CTUs) able to contain symbols belonging to a predetermined set of symbols, of entropy coding of a current block on the basis of at least one probability of symbol occurrence and of predictive coding of a compression parameter (QP) associated with said current block. In the case where the current block is the first block to be coded of a considered set of consecutive blocks to be coded, the following steps are carried out: determination (C40a)), during said step of entropy coding, of probabilities of symbol occurrence for said first current block, based on the probabilities determined of completion of the coding and decoding of the last block of another set of blocks immediately preceding said considered set in the order of coding of the blocks; and assignment (C41a)), during said predictive coding step, of a compression parameter prediction value which is independent of the compression parameter value associated with said last block.

4 Claims, 8 Drawing Sheets

(51) Int. Cl.
*H04N 19/91* (2014.01)
*H04N 19/176* (2014.01)
*H04N 19/44* (2014.01)
*H04N 19/196* (2014.01)
*H04N 19/13* (2014.01)
*H04N 19/593* (2014.01)
*H04N 19/124* (2014.01)
*H04N 19/174* (2014.01)

(52) U.S. Cl.
CPC ......... *H04N 19/176* (2014.11); *H04N 19/196* (2014.11); *H04N 19/44* (2014.11); *H04N 19/593* (2014.11); *H04N 19/91* (2014.11)

(56) References Cited

OTHER PUBLICATIONS

Sato, (Sony) K et al., "Description of Core Experiment 4(CE4): Quantization", 96.MPEG Meeting; Mar. 21, 2011-Mar. 3, 2011; Geneva; (Motion Picture Expert Group or ISO/IEC JTC1/SC29/WG11), XP030048816.

Clare G et al., "An HEVC transcoder converting non-parallel bistreams to/from WPP", 10. JCT-VC Meeting; 101. MPEG Meeting; Nov. 7, 2012-Nov. 20, 2012; Srtockholm; XP030112394.

Muhammed Coban et al., Cu-Level QP Prediction, 5. JCT-VC Meeting; Mar, 16, 2011-Mar. 23, 2011; Geneva; (Joint Collaborative TAM on Video Coding of ISO/IEC JTC1/SC29WG11and ITI-T SG.16), XP030008897.

* cited by examiner

METHOD OF CODING AND DECODING IMAGES, DEVICE FOR CODING AND DECODING COMPUTER PROGRAMS CORRESPONDING THERETO

FIELD OF THE INVENTION

The present invention relates in a general manner to the field of image processing, and more precisely to the coding and decoding of digital images and of sequences of digital images.

The invention can thus notably be used for video coding implemented in video coders today (MPEG, H.264, etc) or in the future ITU-TNCEG (HEVC) or ISO/MPEG (HVC).

BACKGROUND OF THE INVENTION

The HEVC standard currently being developed, which is described in the document "B. Bross, W.-J. Han, J.-R. Ohm, G. J. Sullivan, and T. Wiegand, "High efficiency video coding (HEVC) text specification draft 9," document JCTVC-K1003 of JCT-VC, Shanghai, CN, Oct. 10-19, 2012" is similar to the preceding H.264 standard, in that it uses block partitioning of the video sequence. The HEVC standard is distinguished from the H.264 standard, however, by the fact that the implemented partitioning complies with a tree structure called "quadtree". To that end, as shown in FIG. 1, a current image $I_N$ is partitioned a first time into a plurality of square blocks $CTB_1$, $CTB_2$, ..., $CTB_i$, ..., $CTB_L$, for example of size 64×64 pixels ($1 \leq i \leq L$). For a given block $CTB_i$, this block is considered to be the root of a coding tree in which:
- a first leaf level beneath the root corresponds to a first partitioning depth level for the block $CTB_i$ for which the block $CTB_i$ has been partitioned a first time into a plurality of coding blocks,
- a second leaf level beneath the first leaf level corresponds to a second partitioning depth level for block $CTB_i$ for which some blocks from said plurality of coding blocks for the block $CTB_i$ that has been partitioned a first time are partitioned into a plurality of coding blocks, . . .
- . . . a k-thleaf level beneath the k−1th leaf level that corresponds to a k-th partitioning depth level for block $CTB_i$ for which some blocks from said plurality of coding blocks for the block$CTB_i$ partitioned k−1 times are partitioned a final time into a plurality of coding blocks.

In an HEVC compatible coder, the iteration of the partitioning of the block $CTB_i$ is formed up to a predetermined partitioning depth level.

At the conclusion of the aforementioned successive partitioning of the block $CTB_i$, as shown in FIG. 1, the latter is finally partitioned into a plurality of coding blocks decoded $CB_1$, $CB_2$, ..., $CB_1$, ..., $CB_M$ where $1 \leq j \leq M$.

In reference to FIG. 1, for a given block $CB_j$, this block is considered to be the root of a prediction and transformation tree for said block, for example of discrete cosine transform (DCT) type. The prediction tree for a given block $CB_j$ is representative of the way in which the block $CB_j$ is partitioned into a plurality of blocks, which are called prediction blocks. For a considered prediction block and as in the H.264 standard, the aforementioned HEVC standard implements prediction for pixels of said block in relation to pixels of at least one other block that belongs either to the same image (intra prediction) or to one or more preceding images in the sequence (inter prediction) that have already been decoded. Such preceding images are conventionally called reference images and are kept in memory both for the coder and for the decoder. Inter prediction is commonly called motion compensation prediction.

At the conclusion of the prediction of a considered block, a predicted block is delivered.

In accordance with the HEVC standard, during the transformation operation for a considered coding block $CB_j$, the latter can be partitioned again into a plurality of smaller blocks $TB_1$, $TB_2$, ..., $TB_v$, ..., $TB_Q$ ($1 \leq v \leq Q$) that are called transform blocks or subblocks. Such partitioning complies with a tree structure of "quadtree" type, called "residual quadtree", in which the leaves of the latter respectively represent the transform blocks $TB_1$, $TB_2$, ..., $TB_v$, ..., $TB_Q$ that are obtained on various partitioning depth levels.

Each subblock $TB_1$, $TB_2$, ..., $TB_v$, ..., $TB_Q$ contains the pixels for residue that is representative of the difference between the pixels of the considered prediction block and the pixels of the current coding block $CB_j$.

In the example shown in FIG. 1, the prediction residue of the coding block $CB_j$ is partitioned into ten square subblocks of variable size $TB_1$, $TB_2$, $TB_3$, $TB_4$, $TB_5$, $TB_6$, $TB_7$, $TB_8$ $TB_9$, $TB_{10}$, for example. Such partitioning is shown in dots in FIG. 1.

The pixels of the prediction residue corresponding to each transform block $TB_1$, $TB_2$, ..., $TB_v$, ..., $TB_Q$ can be signaled to the decoder as being all zero by a specific indicator called CBF (abbreviation for "Coded Block Rag").

If this indicator reads 0, the residue is interpreted as being zero in the considered prediction block. In the example shown in FIG. 1, the prediction blocks for which this indicator reads 0 are the subblocks $TB_1$ and $TB_{10}$.

If this indicator reads 1, the residue blocks obtained are then transformed, for example using a transform of DCT (discrete cosine transform) type. In the example shown in FIG. 1, the prediction blocks for which this indicator reads 1 are the blocks $TB_2$ to $TB_9$.

The coefficients of each of the transform residue blocks are then quantified, for example by using uniform scalar quantification, and then coded by means of entropy coding. Such steps are well known as such.

More particularly, the quantification step uses a step of quantification that is determined on the basis of a parameter called QP (abbreviation for "Quantization Parameter"). In the HEVC standard, it is possible to have a parameter QP that is the same for all the transform blocks of an image. To allow better adaptation to the local characteristics of the image, it is likewise possible to modify the parameter QP for each considered coding block. This modification is performed as follows. For a current block, the first transform block that actually contains a residue (CBF=1) is considered. With reference to FIG. 1, such a transform block is the block $TB_2$. A piece of modification information for the parameter QP is then transmitted to the decoder. In the HEVC standard, this information consists of a syntax element denoted QPdelta that is representative of the difference between the parameter QP of the previously coded and then decoded block, called "predicted QP", and the parameter QP of the current block.

It should be noted that the parameter QP of a current transform block is likewise used to determine the filtering force of a deblocking filter. In a manner that is known per se, such filtering is applied to the edge of the transform blocks so as to decrease the block effects that appear in an image, in the border of the transform blocks and the coding blocks.

Particularly in the HEVC standard, various types of filtering can be considered, and the parameter QP is used to determine what type of filtering will be selected. The advantage of such an arrangement is the application of more powerful filtering when the parameter QP is high (which corresponds to high compression for the block), for example. It should be noted that even a block for which all the coefficients are zero (CBF=0), for example the block $CB_1$ in FIG. 1, nevertheless has a QP parameter value that is predicted on the basis of the QP parameter value of the previously coded and then decoded block, such a parameter being able to be used in the case of deblocking filtering.

More particularly, the entropy coding can be implemented in an arithmetic coder called "CABAC" ("Context Adaptive Binary Arithmetic Coder"), which is introduced in the AVC compression standard (also known by the name ISO-MPEG4 part 10 and ITU-T H.264).

This entropy coder implements various concepts:
arithmetic coding: the coder, as initially descried in the document J. Rissanen and G. G. Langdon Jr, "Universal modeling and coding", IEEE Trans. Inform. Theory, vol. IT-27, pp. 12-23, January 1981, uses, for the purposes of coding a symbol, a probability of appearance of this symbol;
adaptation to context: this involves an adaptation of the probability of appearance of the symbols to be coded. Firstly, on-the-fly learning is performed. Secondly, according to the state of the previously coded information, a specific context is used for coding. Each context has a corresponding probability of appearance that is peculiar to the symbol. By way of example, a context corresponds to a type of coded symbol (the representation of a coefficient for a residue, coding mode signaling, . . . ) according to a given configuration, or a state of the vicinity (for example the number of "intra" selected modes in the vicinity, . . . );
binarization: formation of a succession of bits of the symbols to be coded is performed. Subsequently, these various bits are successively sent to the binary entropy coder.

Thus, this entropy coder implements, for each context used, a system of on-the-fly learning of the probabilities in relation to the symbols previously coded for the considered context.

Moreover, a plurality of coding techniques are distinguished in the HEVC standard.

According to a first coding technique, the blocks of a current image are coded and then decoded sequentially according to a lexicographical order, for example according to a line-by-line route for the blocks, of "raster scan" type, starting from the block situated at the top left of the image through to the block situated at the bottom right of the image. In the example shown in FIG. 1, the blocks $CTB_1$ to $CTB_L$ are coded and then decoded successively.

If the current block is the first block to be coded in a considered set of consecutive blocks to be coded, for example a line of blocks, the method involves:
determination, during the entropy coding of this first current block, of symbol appearance probabilities for said first current block, said probabilities being those that have been determined for the last coded and then decoded block in the preceding line of blocks,
determination of the syntax element denoted QPdelta that is representative of the difference between a predicted QP parameter value, which is that of the last coded and then decoded block in the preceding line of blocks, and a predetermined QP parameter value that the coder wishes to associate with the first current block.

Such a technique obtains compression performance levels for the image that are high. However, the entropy coding and decoding of a symbol being dependent on the state of the probability that has been learned up to that point, the symbols can be decoded only in the same order as that used for coding. Typically, the decoding can then only be sequential, thus preventing parallel decoding of a plurality of symbols (for example in order to benefit from multicore architectures).

According to a second coding technique called WPP (abbreviation for "Wavefront Parallel Processing"), the blocks of a current image are grouped into a predetermined number of sets of neighboring blocks in twos. In the example shown in FIG. 1, said sets of blocks are formed by each of the lines L1 to L6 of the image $I_N$, for example. The sets of blocks formed in this manner are coded or decoded in parallel. Of course, such coding requires the blocks respectively situated above and above on the right of the current block to be available, so as to be able to extract therefrom the data that are necessary for the prediction of said current block (values of decoded pixels allowing prediction of the pixels of the current block in intra mode, and value of the motion vectors in inter mode).

According to this second coding technique, if the current block is the first block to be coded in a considered set of consecutive blocks to be coded, for example a line of blocks, the method involves:
determination, during the entropy coding of this first current block, of symbol appearance probabilities for said first current block, said probabilities being those that have been determined at the conclusion of the coding and decoding of the second block in the preceding line of blocks,
determination of the syntax element denoted QPdelta that is representative of the difference between a predicted QP parameter value, which is a predetermined value called QPslice, and a predetermined QP parameter value that the coder is intended to associate with the first current block.

In this way, it is possible to start the coding of a current line of blocks without waiting for the first block in the preceding line to be coded and then decoded. Such an arrangement has the advantage of speeding up the processing time of the coder/decoder and of benefiting from a multiplatform architecture for the coding/decoding of an image. However, the compression performance levels obtained according to this second technique are not optimum taking account of the fact that the learning of the probabilities of the CABAC entropy coder is made slower on account of the initialization of the probabilities at the beginning of a line.

Moreover, the documents mentioned at the address http://phenix.int-evry.fr/jct/doc_end_user/documents/10_Stockholm/wg11/JCTVC-J0032-v3.zip, propose either converting an image in which the blocks have been coded in WPP mode into an image in which the blocks have been coded in sequential mode or, conversely, converting an image in which the blocks have been coded in sequential mode into an image in which the blocks have been coded in WPP mode.

Conversion from WPP mode into sequential mode can allow an improvement in the compression performance levels at the expense of a loss of capacity for coding/decoding the lines in parallel. The conversion from sequential mode to WPP mode can allow "parallelization" of a stream of coded blocks that would have been received but that would not have been encoded in WPP mode, all this at the expense of a slight loss of compression efficiency.

In the case of conversion from WPP mode to sequential mode, for example, the method first of all involves entropy decoding of the blocks of the image that have been coded in WPP mode. The method then involves entropy reencoding of said entropically decoded blocks, in comparison with sequential mode.

A disadvantage of conversion of the aforementioned type is that it works only when the parameter QP is constant in the image, that is to say that the value of the parameter QP is identical for each block of the image.

The reason is that when the parameter QP varies from one block to another in a considered stream of coded blocks, it is necessary, in addition to these aforementioned steps of entropy decoding and entropy reencoding, to decode the syntax elements QPdelta that are representative of the variations of the parameter QP, and then to modify the value of these syntax elements so that the parameter QP of each block is identical in WPP mode and in sequential mode. Such an arrangement proves necessary particularly owing to the fact that the first block in a line inherits a parameter QP that is not the same according to whether the coder is working in sequential mode or in WPP mode, as has been described above.

Moreover, supposing that the first block in a line does not have a residue (CBP=0), the decoding of the syntax element QPdelta will not be able to be performed because this syntax element will not have been transmitted. Thus, the case may therefore arise that the parameter QP of the first block in a line is different in WPP mode and non-WPP mode, which gives rise to deblocking filtering along the border of this first block that is different according to whether the coder is working in sequential mode or in WPP mode. Therefore, said first block will be decoded differently in sequential mode and in WPP mode, which will make the image impossible to decode, since the first coded block in a line will not be the one expected. The values of the pixels of said first coded block being likely to be reused for the intra prediction of the following blocks, but being different from the expected values, it is therefore the whole process of decoding the image that will be erroneous.

SUBJECT AND SUMMARY OF THE INVENTION

One of the aims of the invention is to overcome the disadvantages of the aforementioned prior art.

For this end, one subject of the present invention concerns a method for coding at least one image comprising the steps of:
  partitioning of the image into a plurality of blocks that are capable of containing symbols belonging to a predetermined set of symbols,
  entropy coding of a current block on the basis of at least one symbol appearance probability,
  predictive coding of a compression parameter associated with the current block.

The coding method according to the invention is remarkable in that if the current block is the first block to be coded in a considered set of consecutive blocks to be coded then the method involves the steps of:
  determination, during the step of entropy coding, of symbol appearance probabilities for the first current block, the aforementioned probabilities being those that are determined at the conclusion of the coding and then the decoding of the last block in another considered set of blocks, the other set immediately preceding, in the order of coding of the blocks, the considered set,
  assignment, during the step of predictive coding of a compression parameter associated with the first current block, of a compression parameter prediction value that is independent of the value of the compression parameter associated with the last block.

Such an arrangement allows production of a coded image on which it is possible to perform error-free transcoding of sets of blocks that have been coded sequentially into sets of blocks that have been coded in parallel and vice versa, particularly if a compression parameter, such as the quantification parameter, varies from one block to the other in a considered image.

Such an arrangement likewise makes it possible to benefit not only from the compression performance levels that are peculiar to sequential mode but also from the speed of processing time by the coder/decoder, once the image has been converted to WPP mode.

Compression parameters, other than the aforementioned quantification parameter, can be considered, such as a parameter determining the number of intra modes available, a parameter describing the maximum size of the motion vectors, etc. . . .

In one particular embodiment, the blocks having previously been partitioned into subblocks, the assigned compression parameter prediction value is that of the compression parameter associated with the last subblock of the first block of the other set that immediately precedes, in the order of coding of the blocks, the considered set.

Such an arrangement has the advantage of allowing determination of the prediction value for the compression parameter from the start of processing of the preceding set of blocks (for example a higher line of blocks than the current line of blocks), which thus minimizes the waiting time for coding the current set of blocks (current line of blocks).

In another particular embodiment, the blocks having previously been partitioned into subblocks, the assigned compression parameter prediction value is that of the compression parameter associated with the last subblock of the second block of the other set that immediately precedes, in the order of coding of the blocks, the considered set.

Such an arrangement has the advantage of allowing certain statistical learning of the value of the compression parameter on the data of the set of blocks preceding the current block. The efficiency of the prediction is thus made higher.

In yet another particular embodiment, the blocks having previously been partitioned into subblocks, the assigned compression parameter prediction value is that of the compression parameter associated with the first subblock of the first block of the image.

Such an arrangement has the advantage of providing a compromise between the waiting time for coding the current set of blocks and the statistical learning that have been mentioned above. In yet another particular embodiment, the assigned compression parameter prediction value is that of the compression parameter associated with the image.

If the image is coded in compliance with the HEVC standard, a block is a coding block and a subblock is a transform block.

In yet another particular embodiment, the assigned compression parameter prediction value is that of the compression parameter associated with a set of blocks that are capable of being coded independently of other blocks of the image.

Such a set of blocks that are capable of being coded independently of other blocks of the image is called a "slice". The compression parameter associated with a slice is the parameter with the value QPslice, for example, which is used in the HEVC standard when the image is divided into "slices". In a general manner, a slice is a group of consecutive blocks that are coded and then decoded independently, that is to say that they do not use any information from blocks situated outside the slice (for example they can't use the pixels that are outside the slice to perform intra prediction). In the HEVC standard, it is known that each slice has a transmitted value called QPslice. For a considered slice, the first block of the slice takes the value QPslice as a compression parameter prediction value.

The considered slices are each representative of an area of the image that exhibits a certain homogeneity in terms of texture. Owing to this, for each transform block of the slice containing a residue, the syntax element QPdelta will be not as high as in the case of an area of the image with a high level of contrast. The result of this is that the syntax element QPdelta is less costly to signal to the decoder.

Correlatively, the invention also concerns a device for coding at least one image, which device is intended to implement the aforementioned coding method, such a device comprising:
    means for partitioning the image into a plurality of blocks that are capable of containing symbols belonging to a predetermined set of symbols,
    means for entropy coding of a current block on the basis of at least one symbol appearance probability,
    means for predictive coding of a compression parameter associated with the current block.

Such a coding device is remarkable in that if the current block is the first block to be coded in a considered set of consecutive blocks to be coded then:
    the entropy coding means determine symbol appearance probabilities for the first current block, the aforementioned probabilities being those that have been determined at the conclusion of the coding and then the decoding of the last block in another considered set of blocks, this other set immediately preceding, in the order of coding of the blocks, the considered set,
    the means for predictive coding of a compression parameter associated with the first current block assign a compression parameter prediction value that is independent of the value of the compression parameter associated with the last block.

Correspondingly, the invention also concerns a method for decoding a stream that is representative of at least one coded image, comprising the steps of:
    identification, in the stream, of a plurality of coded blocks, the aforementioned blocks being capable of containing symbols belonging to a predetermined set of symbols,
    entropy decoding of a current coded block on the basis of at least one symbol appearance probability,
    predictive decoding of a compression parameter associated with the current coded block.

Such a decoding method is remarkable in that if the current block is the first block to be decoded in a considered set of consecutive blocks to be decoded then the method involves the steps of:
    determination, during the step of entropy decoding, of symbol appearance probabilities for the first current block, the probabilities being those that have been determined at the conclusion of the decoding of the last block in another considered set of blocks, this other set immediately preceding, in the order of decoding of the blocks, the considered set,
    assignment, during the step of predictive decoding of a compression parameter associated with the first current block, of a compression parameter prediction value that is independent of that of the compression parameter associated with the aforementioned last block.

In one particular embodiment, the blocks having been partitioned into subblocks, the assigned compression parameter prediction value is that of the compression parameter associated with the last subblock of the first block of the other set that immediately precedes, in the order of decoding of the blocks, the considered set.

In another particular embodiment, the blocks having been partitioned into subblocks, the assigned compression parameter prediction value is that of the compression parameter associated with the last subblock of the second block of the other set that immediately precedes, in the order of decoding of the blocks, the considered set.

In yet another particular embodiment, the blocks having previously been partitioned into subblocks, the assigned compression parameter prediction value is that of the compression parameter associated with the first subblock of the first block of the image.

In yet another particular embodiment, the assigned compression parameter prediction value is that of the compression parameter associated with a set of blocks that are capable of being decoded independently of other blocks of the image.

Correlatively, the invention concerns a device for decoding a stream that is representative of at least one coded image, which device is intended to implement the aforementioned decoding method, such a device comprising:
    means for identification, in the stream, of a plurality of coded blocks, the aforementioned blocks being capable of containing symbols belonging to a predetermined set of symbols,
    means for entropy decoding of a current coded block on the basis of at least one symbol appearance probability,
    means for predictive decoding of a compression parameter associated with the current coded block.

Such a decoding device is remarkable in that if the current block is the first block to be decoded in a considered set of consecutive blocks to be decoded then
    the means for entropy decoding determine symbol appearance probabilities for the first current block, the aforementioned probabilities being those that have been determined at the conclusion of the decoding of the last block of another considered set of blocks, this other set immediately preceding, in the order of decoding of the blocks, the considered set,
    the means for predictive decoding of a compression parameter associated with the first current block assign a compression parameter prediction value that is independent of that of the compression parameter associated with the aforementioned last block.

The invention is likewise aimed at a computer program having instructions for executing the steps of the above coding or decoding method when the program is executed by a computer.

Such a program can use any programming language and be in the form of a source code, object code or an intermediate code between source code and object code, such as in a partially compiled form, or in any other desirable form.

Yet another subject of the invention is also aimed at a computer-readable recording medium having computer program instructions as mentioned above.

The recording medium may be any entity or device that is capable of storing the program. By way of example, the medium may have a storage means, such as a ROM, for example a CD-ROM or a microelectronic circuit ROM, or else a magnetic recording means, for example a USB key or a hard disk.

Moreover, such a recording medium may be a transmissible medium such as an electrical or optical signal, which can be conveyed via an electrical or optical cable, by radio or by other means. The program according to the invention may be downloaded on a network of internet type, in particular.

Alternatively, such a recording medium may be an integrated circuit that incorporates the program, the circuit being suited to executing the method in question or to being used in the execution thereof.

The coding device, the decoding method, the decoding device and the computer programs that have been cited above have at least the same advantages as those provided by the coding method according to the present invention.

BRIEF DESCRIPTION OF THE DRAWINGS

Other features and advantages will emerge upon reading two preferred embodiments that are described with reference to the figures, in which.

DETAILED DESCRIPTION OF AN EMBODIMENT OF THE CODING PART

An embodiment of the invention will now be described in which the coding method according to the invention is used to code an image or a sequence of images according to a binary stream that is close to that obtained by coding in compliance with the HEVC standard that is being developed, for example.

In this embodiment, the coding method according to the invention is implemented in software or hardware fashion, for example, by virtue of modifications to a coder initially compliant with the HEVC standard. The coding method according to the invention is shown in the form of an algorithm having steps C1 to C4 shown in FIG. 2A.

Figure 3A:
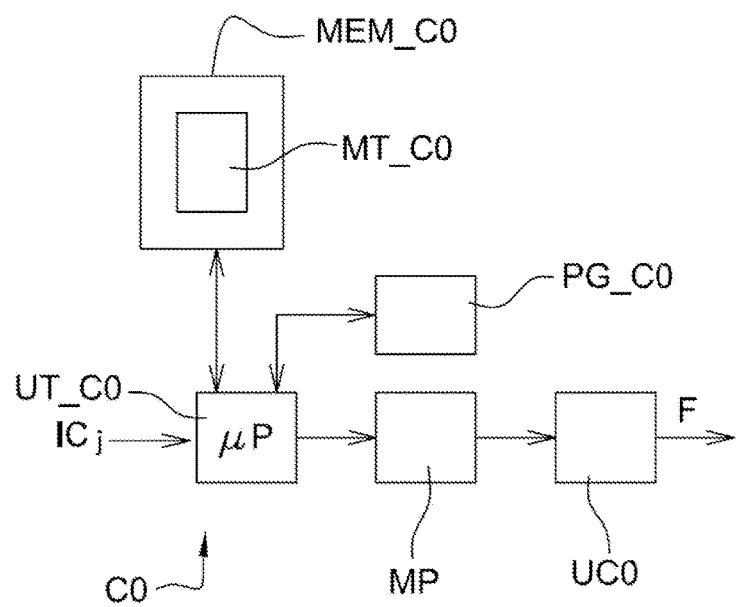
FIG. 3A shows an embodiment of a coding device according to the invention.

According to the embodiment of the invention, the coding method according to the invention is implemented in a coding device CO shown in FIG. 3A.

As shown in FIG. 3A, such a coding device comprises a memory MEM_CO comprising a buffer memory MT_CO, a processing unit UT_CO equipped with a microprocessor µP, for example, and controlled by a computer program PG_CO that implements the coding method according to the invention. On initialization, the code instructions of the computer program PG_CO are loaded into a RAM memory, for example, before being executed by the processor of the processing unit UT_CO.

Figure 1:
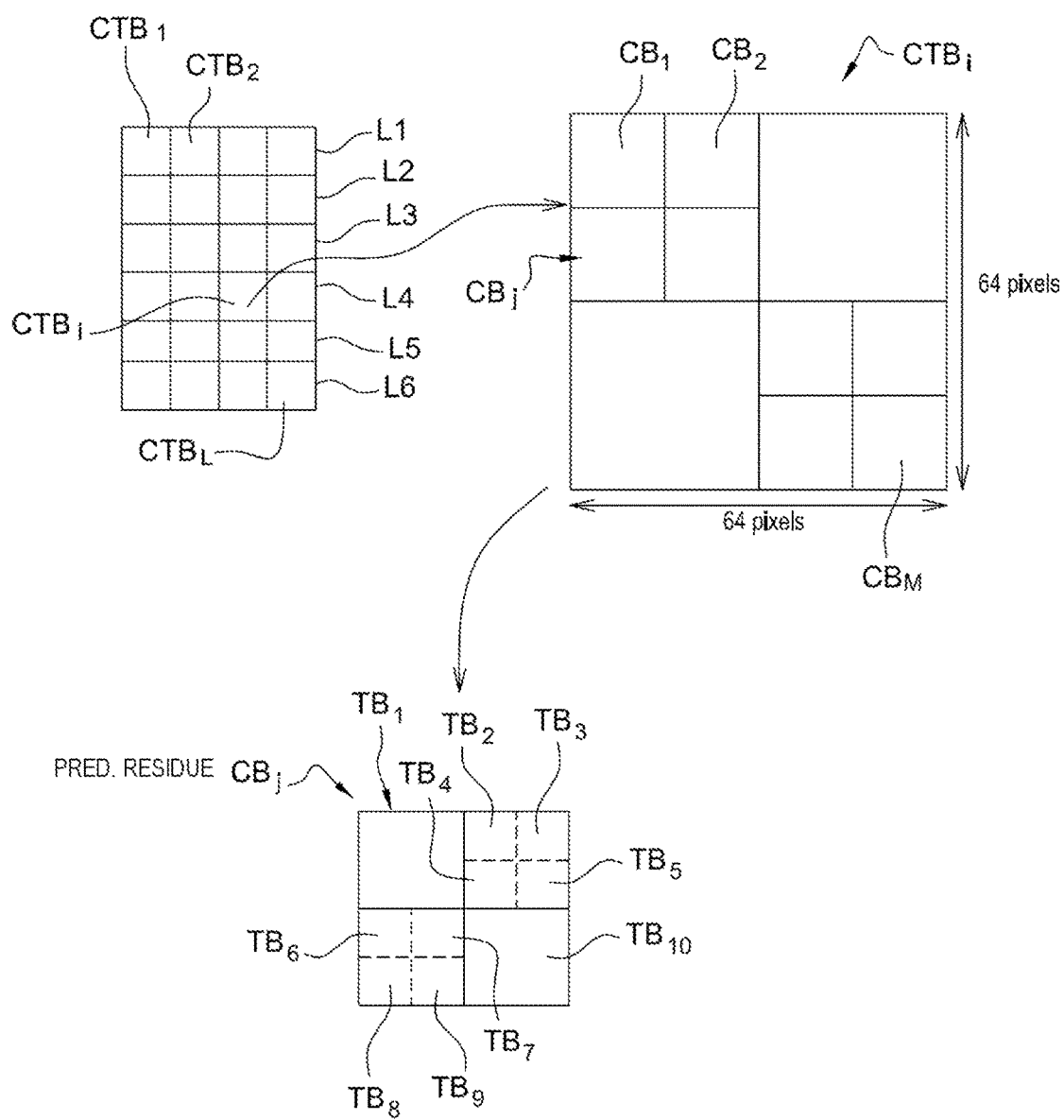
FIG. 1 shows an image coding diagram from the prior art.
Figure 2A:
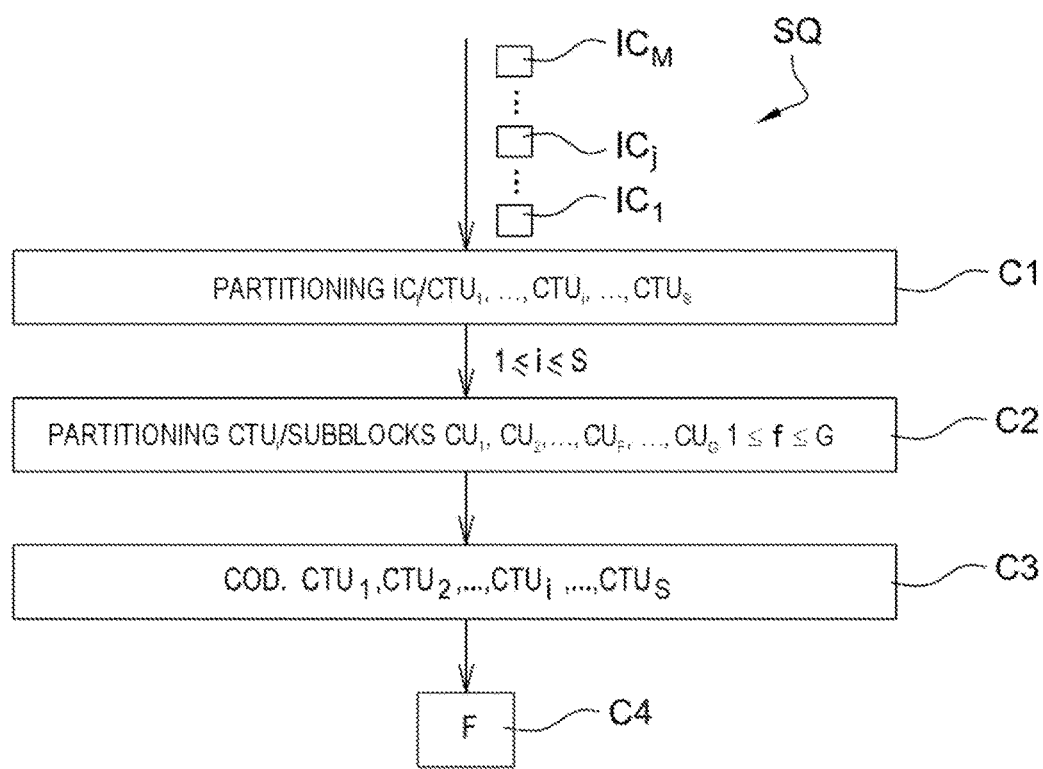
FIG. 2A shows the main steps of the coding method according to the invention.

The coding method shown in FIG. 2A applies to any current image in a sequence SQ of images to be coded.

In the course of a first step C1 shown in FIG. 2A, the method involves, in a manner known per se, the partitioning of a current image $IC_j$ belonging to the sequence SQ of images $IC_1, \ldots, IC_j, \ldots, IC_M$, into a plurality of blocks $CTU_1, CTU_2, \ldots, CTU_i, \ldots, CTU_S$, for example of size 64×64 pixels ($1 \le i \le S$). Such a partitioning step is implemented by a software partitioning module MP shown in FIG. 3A, which module is controlled by the microprocessor µP of the processing unit UT_CO.

Figure 4:
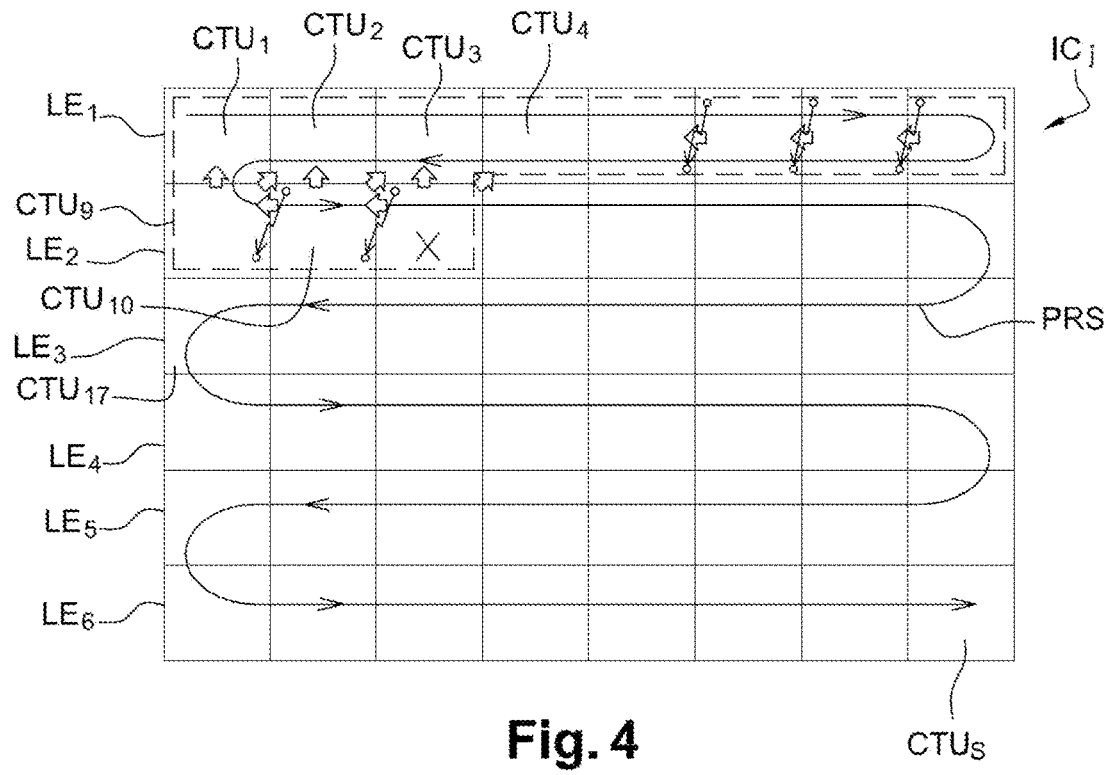
FIG. 4 shows a diagram of image coding/decoding of sequential type.

The image $IC_j$ partitioned in this manner is shown in FIG. 4.

It should be noted that, within the context of the invention, the term "block" means coding unit. The latter terminology is notably used in the HEVC standard, for example in the document "B. Bross, W.-J. Han, J.-R. Ohm, G. J. Sullivan, and T. Wiegand, "High efficiency video coding (HEVC) text specification draft 6," document JCTVC-H1003 of JCT-VC, San Jose Calif., USA, February 2012".

In particular, such a coding unit groups sets of pixels of rectangular or square shape, also called blocks, microblocks, or else sets of pixels having other geometric shapes.

Said blocks $CTU_1, CTU_2, \ldots, CTU_i, \ldots, CTU_S$ are capable of containing one or more symbols, said symbols forming part of a predetermined set of symbols.

In the course of a step C2 that is shown in FIG. 2A, for a previously selected current block $CTU_i$, the partitioning module MP partitions said block into a plurality of smaller blocks called coding blocks $CU_1, CU_2, \ldots, CU_f, \ldots, CU_G$ where $1 \le f \le G$. Such partitioning is compliant with a tree structure of "quadtree" type, as described in the description above. Other types of tree structure can of course be envisaged.

Step C2 is reiterated for the set of blocks $CTU_1, CTU_2, \ldots, CTU_S$.

Figure 5:
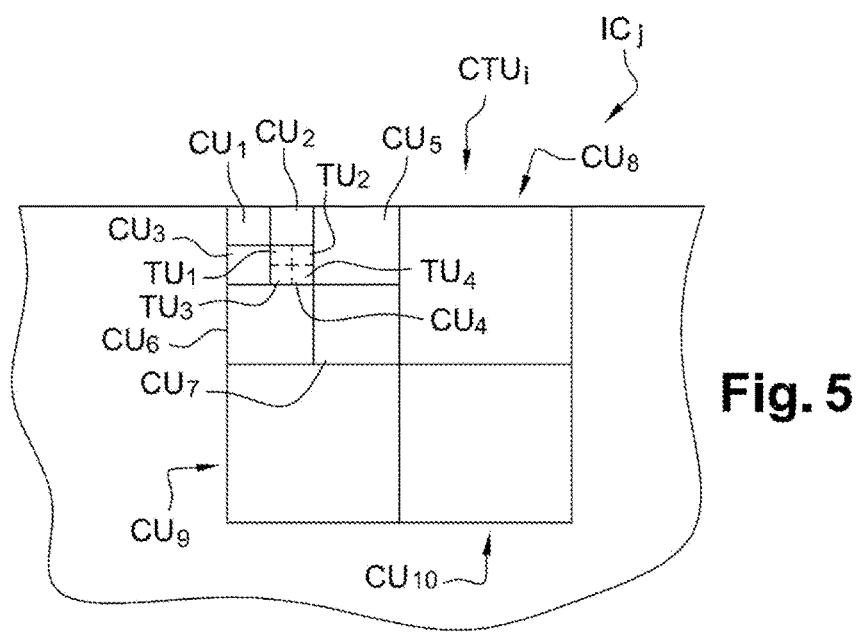
FIG. 5 shows an example of partitioning of a block of the current image into subblocks.

An example of partitioning of the block $CTU_i$ is shown in FIG. 5. In this example, the block $CTU_i$ is partitioned in accordance with a tree structure of "quadtree" type into four blocks $CU_1$ to $CU_{10}$.

With reference to FIG. 2A, the method involves, in the course of a step C3, the coding of the blocks $CTU_1, CTU_2, \ldots, CTU_i, \ldots, CTU_S$ according to a predetermined route order, which is of the aforementioned raster scan type, for example. In the example shown in FIG. 4, the blocks $CTU_1, CTU_2, \ldots, CTU_i, \ldots, CTU_S$ are coded one after the other, from left to right, as indicated by the arrow PRS.

Such coding is of sequential type and is implemented by a coding module UCO as shown in FIG. 3A, which module is controlled by the microprocessor µP of the processing unit UT_CO. In a manner known as such, the buffer memory MT_CO of the coder CO is suited to containing the symbol appearance probabilities as progressively updated in the course of the coding of a current block.

Figure 3B:
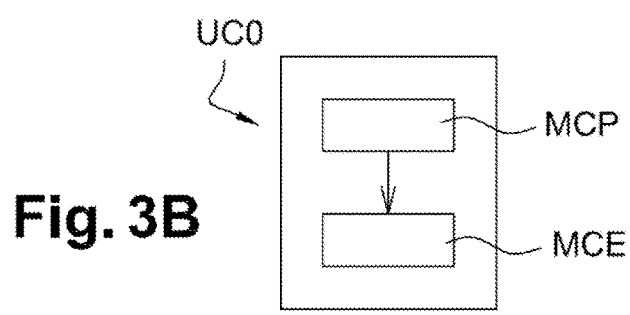
FIG. 3B shows a coding module of the coding device of FIG. 3A.

As shown in more detail in FIG. 3B, the coding module UCO comprises:

a module for predictive coding of a current block in relation to at least one previously coded and decoded block, denoted MCP;

a module for entropy coding of said current block for the use of at least one symbol appearance probability calculated for said previously coded and decoded block, denoted MCE.

The predictive coding module MCP is a software module that is capable of performing predictive coding of the current block, using conventional prediction techniques, such as in intra and/or inter mode.

The entropy coding module MCE, for its part, is of CABAC type, but modified according to the present invention as will be described further on in the description.

As a variant, the entropy coding module MCE could be a Huffman coder that is known as such.

In the example shown in FIG. 4, the module UCO codes the blocks in the first line $LE_1$, from left to right. When it gets to the last block in the first line $LE_1$, it moves to the first block in the second line $LE_2$. When it gets to the last block in the second line $LE_2$, it moves to the first block in the third line $LE_3$. When it gets to the last block in the third line $LE_3$, it moves to the first block in the fourth line $LE_4$, and so on until the last block of the current image $IC_j$ is coded.

Other types of route than the one that has just been described above are of course possible. Thus, it is possible to chop the image $IC_j$ into a plurality of subimages called slices and to independently apply chopping of this type to each subimage. It is likewise possible for the coding module UCO to process not a succession of lines as explained above but rather a succession of columns. It is likewise possible to run through the lines or columns in one direction or in the other.

With reference to FIG. 2A, in the course of a step C4, the method involves the construction of a stream F that is capable of being converted to WPP mode. The stream F is then transmitted by a communication network (not shown) to a remote terminal. The latter has the decoder DO shown in FIG. 7A.

A description will now be given, with reference to FIG. 2B, of the various specific substeps of the invention, as implemented during the aforementioned coding step C3, in the coding module UCO shown in FIGS. 3A and 3B.

Figure 2B:
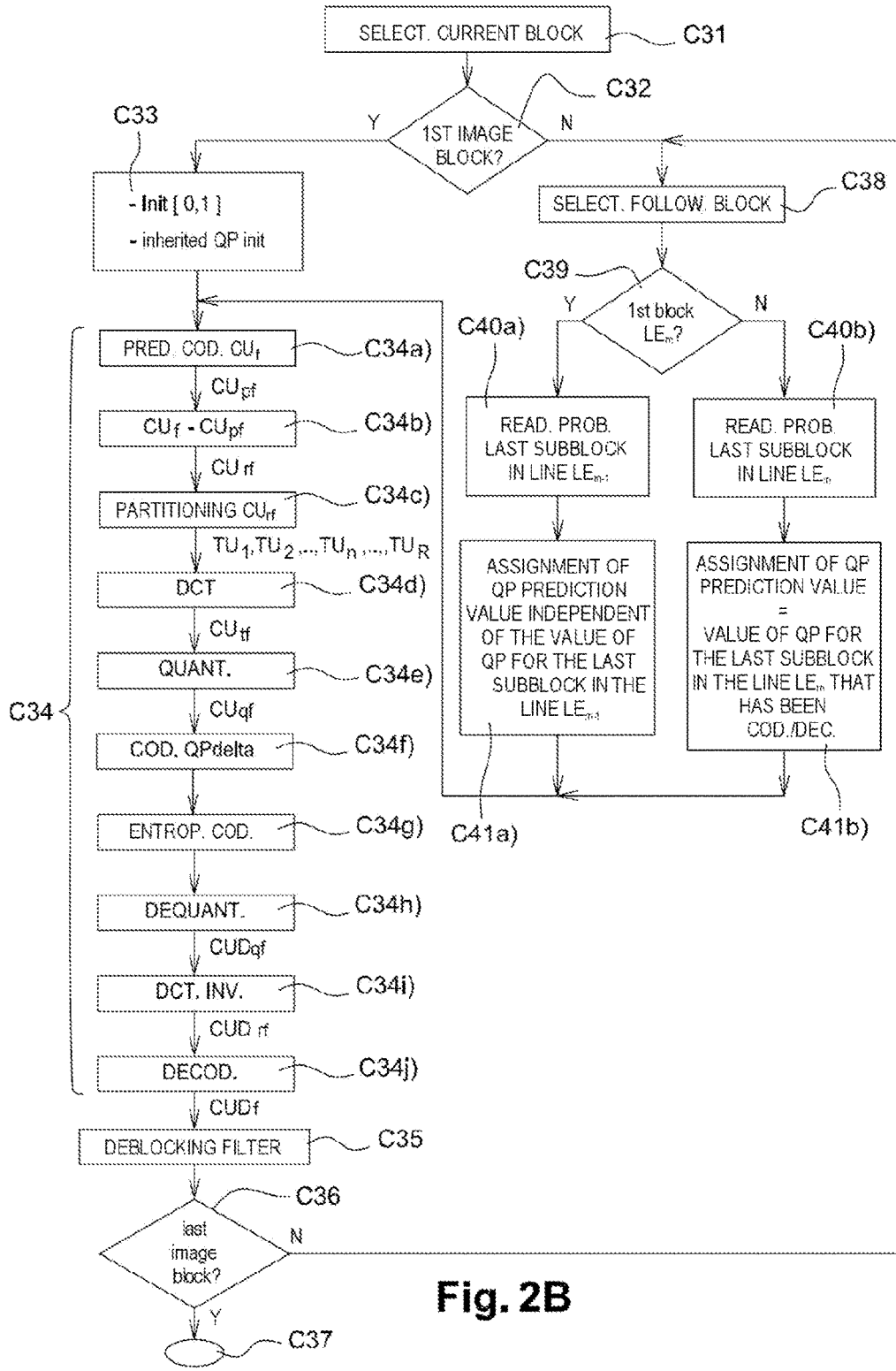
FIG. 2B shows a detailed view of the coding implemented in the coding method of FIG. 2A.

In the course of a step C31 that is shown in FIG. 2B, the coding module UCO selects as the current block the first subblock to be coded in a block $CTU_i$ in a current line $LE_m$ shown in FIG. 4, such as the first line $LE_1$. In the remainder of the description, this subblock will be called a block.

In the course of a step C32 that is shown in FIG. 2B, the coding module UCO tests whether the current block is the first block (situated at the top and on the left) of the image $IC_j$ that has been chopped in blocks, and then into subblocks, in the aforementioned step C1.

If this is the case, in the course of a step C33 that is shown in FIG. 2B, the entropy coding module MCE initializes the symbol appearance probabilities.

In the course of this same step C33 that is shown in FIG. 2B, the method involves the initialization of an aforementioned compression parameter value. In the example shown, the considered compression parameter is the quantification parameter QP. In accordance with the HEVC standard, the aforementioned parameter value QP is initialized to the value QPslice.

If, following the aforementioned step C32, the current block is not the first block of the image $IC_j$, a test is performed, in the course of a step C39 that will be described later in the remainder of the description, to determine whether the current block is the first block in the considered line $LE_m$.

In the course of a step C34 that is shown in FIG. 2B, the method involves the coding of the first current block $CU_1$ in the first line $LE_1$, shown in FIG. 4. Such a step C34 comprises a plurality of substeps C34a) to C34j) that will be described below.

In the course of a first substep C34a) that is shown in FIG. 2B, the predictive module MCP of FIG. 3B performs the predictive coding of the current block $CU_1$ using known intra and/or inter prediction techniques, in the course of which the block $CU_1$ is predicted in relation to at least one previously coded and then decoded block.

It goes without saying that other modes of intra prediction as proposed in the HEVC standard are possible.

The current block $CU_1$ can likewise be subjected to predictive coding in inter mode, in the course of which the current block is predicted in relation to a block from a previously coded and then decoded image. Other types of prediction are of course envisageable. Among the possible predictions for a current block, the best prediction is chosen in accordance with a rate-distortion criterion that is well known to the person skilled in the art.

Said aforementioned predictive coding substep allows the construction of an aforementioned block $CUp_1$ that is an approximation of the current block $CU_1$. The information relating to this predictive coding will subsequently be entered into the stream F that is transmitted to the decoder DO. Such information notably comprises the type of prediction (inter or intra) and, if need be, the mode of intra prediction, the type of partitioning of a block or macroblock if the latter has been partitioned, the reference image index and the displacement vector that are used in the inter prediction mode. This information is compressed by the coder CO.

In the course of a subsequent substep C34b) that is shown in FIG. 2B, the method involves the subtraction of the predicted block $CUp_1$ from the current block $CU_1$ in order to produce a residue block $CUr_1$.

In the course of a subsequent substep C34c) that is shown in FIG. 2B, the method involves the partitioning of the residue block $CUr_1$ into transform blocks $TU_1, TU_2, \ldots, TU_n, \ldots, TU_R$, where $1 \leq n \leq R$. In the example shown in FIG. 5, the residue block $CUr_1$ has been partitioned into four transform blocks $TU_1, TU_2, TU_3, TU_4$.

In the course of a subsequent substep C34d) that is shown in FIG. 2B, the method involves the transformation of each transform block from the residue block $CUr_1$ using a conventional operation of direct transformation such as discrete cosine transformation of DCT type in order to produce a transformed block $CUt_1$.

In the course of a subsequent substep C34e) that is shown in FIG. 2B, the method involves the quantification of the transformed block $CUt_1$ using a conventional quantification operation, such as scalar quantification, which uses a quantification parameter QP, as is the case in the HEVC standard. A block of quantified coefficients $CUq_1$ is then obtained.

In the course of a subsequent substep C34f) that is shown in FIG. 2B, if the current transform block $TU_n$ is the first transform block of the current block $CTU_i$ that contains a residue (CBF=1), such as the block $TU_1$ in FIG. 5, the method involves the coding of the syntax element QPdelta, which is representative of the difference between the parameter QP of the previously coded and then decoded subblock, called "predicted QP", and the parameter QP of the current subblock.

In the course of a subsequent substep C34g) that is shown in FIG. 2B, the method involves the entropy coding of the block of quantified coefficients $CUq_1$. In the preferred embodiment, this is CABAC entropy coding. Such a step involves:
  a) reading the symbol(s) of the predetermined set of symbols that are associated with said current block,
  b) associating digital information, such as bits, with the read symbol(s).

In the course of a subsequent substep C34h) that is shown in FIG. 2B, the method involves the dequantification of the block $CUq_1$ using a conventional dequantification operation, which is the inverse operation of the quantification performed in step C34e). A block of dequantified coefficients $CUDq_1$ is then obtained.

In the course of a subsequent substep C34i) that is shown in FIG. 2B, the method involves the inverse transformation of the block of dequantified coefficients $CUDq_1$, which is the inverse operation of the direct transformation performed in step C34d) above. A decoded residue block $CUDr_1$ is then obtained.

In the course of a subsequent substep C34j) that is shown in FIG. 2B, the method involves the construction of the decoded block $CUD_1$ by adding to the predicted block $CUp_1$ the decoded residue block $CUDr_1$. It should be noted that the latter block is the same as the decoded block obtained at the conclusion of the method for decoding the image $IC_j$ that will be described further on in the description. The decoded block $CUD_1$ is thus made available for use by the coding module UCO shown in FIGS. 3A and 3B.

At the conclusion of the aforementioned coding step C34, the entropy coding module MCE as shown in FIG. 3B contains all the probabilities as progressively updated in the course of the coding of the first block. These probabilities correspond to the various possible syntax elements and to the various associated coding contexts.

In the course of a subsequent step C35 that is shown in FIG. 2B, the decoded block $CUD_1$ is filtered by means of a deblocking filter in compliance with the HEVC standard. In particular, the deblocking filter uses the quantification parameter QP of the current transform block $TU_n$ in order to determine the filtering force that should be applied.

In the course of a subsequent step C36 that is shown in FIG. 2B, the coding module UCO tests whether the current block in the line $LE_m$ that has just been coded is the last block of the image $IC_j$.

If the current block is the last block of the image $IC_j$, in the course of a subsequent step C37 that is shown in FIG. 2B, the coding method is terminated.

If this is not the case, the method involves, in the course of a subsequent step C38 that is shown in FIG. 2B, the selection of the subsequent block $CU_f$ to be coded in accordance with the route order shown by the arrow PRS in FIG. 4.

In the course of a subsequent step C39 that is shown in FIG. 2B, a test is performed to determine whether the current block is the first block in the considered line $LE_m$.

If this is the case, in the course of a step C40a) of entropy coding that is shown in FIG. 2B, the entropy coding module MCE of FIG. 3B starts to code the first current block in the considered line $LE_m$ with the symbol appearance probabilities calculated at the conclusion of the coding and then decoding of the last subblock of the last block $CTU_d$ ($1 \leq d \leq S$) in the preceding line $LE_{m-1}$.

With reference to FIG. 2B, in the course of a step C41a) of predictive coding of a compression parameter associated with said first current block, such as the quantification parameter QP, the predictive coding module MCP of FIG. 3B assigns a compression parameter prediction value that is independent of the value of the compression parameter associated with said last subblock of the last block $CTU_d$ ($1 \leq d \leq S$) in the preceding line $LE_{m-1}$.

According to a first variant of step C41a), the assigned prediction value for the quantification parameter QP is that of the quantification parameter associated with the last subblock of the first block CTU in the preceding line $LE_{m-1}$. With reference to FIG. 4, if the current block is the first subblock of the block $CTU_{17}$ in the third line $LE_3$, for example, the assigned prediction value for the quantification parameter QP is that of the quantification parameter associated with the last subblock of the first block $CTU_9$ in the second line $LE_2$.

According to a second variant of step C41a), the assigned prediction value for the quantification parameter QP is that of the quantification parameter associated with the last subblock of the second block CTU in the preceding line $LE_{m-1}$. With reference to FIG. 4, if the current block is the first subblock of the block $CTU_{17}$ in the third line $LE_3$, for example, the assigned prediction value for the quantification parameter QP is that of the quantification parameter associated with the last subblock of the second block $CTU_{10}$ in the second line $LE_2$.

According to a third variant of step C41a), the assigned prediction value for the quantification parameter QP is that of the quantification parameter associated with the first subblock of the first block CTU of the image $IC_j$. With reference to FIG. 4, if the current block is the first subblock of the block $CTU_{17}$ in the third line $LE_3$, for example, the assigned prediction value for the quantification parameter QP is that of the quantification parameter associated with the first subblock of the first block $CTU_1$ in the first line $LE_1$.

According to a fourth variant of step C41a), if the image $IC_j$ has been chopped into a plurality of slices, the prediction value assigned to the first current block for the quantification parameter QP is the value QP slice of the slice that contains said first current block.

Following step C41a), the current block is coded and then decoded by virtue of iteration of steps C34 to C37 that are described above.

If, following aforementioned step C39, the current block is not the first block in the considered line $LE_m$, the method involves, in the course of a step C40b) of entropy coding that is shown in FIG. 2B, the reading of the probabilities from the last previously coded and decoded subblock that is on the same line $LE_m$ as the current block to be coded, that is to say the last coded and then decoded subblock of the block CTU that is situated immediately left of the current block. Such a step is performed by the entropy coding module MCE shown in FIG. 3B.

With reference to FIG. 2B, the method then involves, in the course of a step C41b) of predictive coding of a compression parameter associated with said current block, such as the quantification parameter QP, the assignment of a QP parameter prediction value to the value of the parameter QP of the last previously coded and decoded subblock that is on the same line $LE_m$ as the current block to be coded, that is to say the last coded and then decoded subblock of the block CTU that is situated immediately to the left of the current block. Such a step is performed by the predictive coding module MCP shown in FIG. 3B.

Following step C41b), the current block is coded and then decoded by virtue of iteration of steps C34 to C37 that are described above.

The coding steps that have just been described above are implemented for all blocks $CTU_1$, $CTU_2$, ..., $CTU_i$, ..., $CTU_S$ to be coded in the current image $IC_j$ under consideration.

Detailed Description of an Embodiment of the Decoding Part

An embodiment of the decoding method according to the invention will now be described in which the decoding method is implemented in software or hardware fashion by virtue of modifications to a decoder initially compliant with the HEVC standard. The decoding method according to the invention is shown in the form of an algorithm having steps D1 to D4 as shown in FIG. 6A.

Figure 7A:
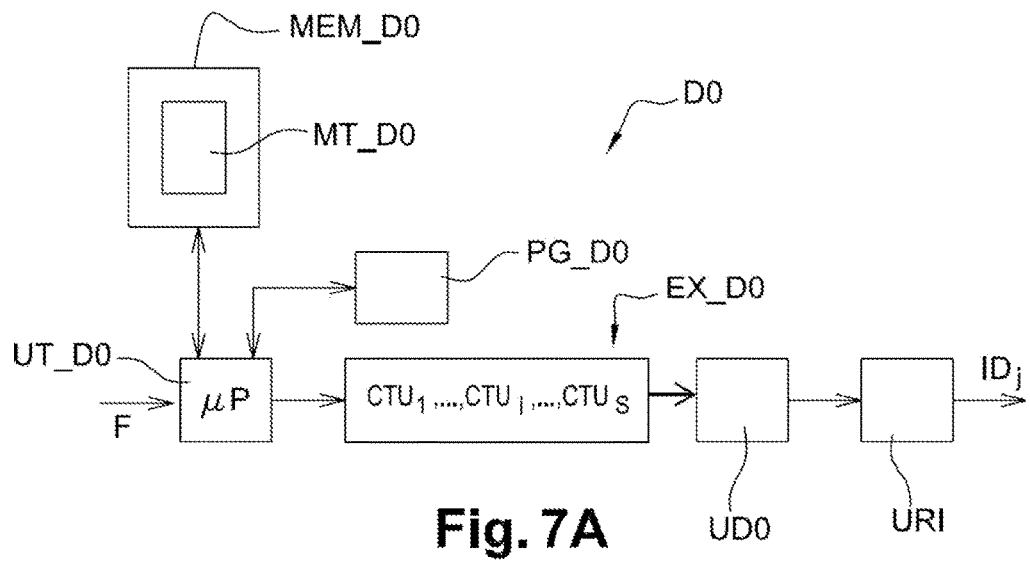
FIG. 7A shows an embodiment of a decoding device according to the invention.

As illustrated in FIG. 7A, a decoder according to the invention comprises a memory MEM_DO comprising a buffer memory MT_DO and a processing unit UT_DO that is equipped with a microprocessor µP, for example, and controlled by a computer program PG_DO that implements the decoding method according to the invention. On initialization, the code instructions of the computer program PG_DO are loaded into a RAM memory before being executed by the processor of the processing unit UT_DO, for example.

Figure 6A:
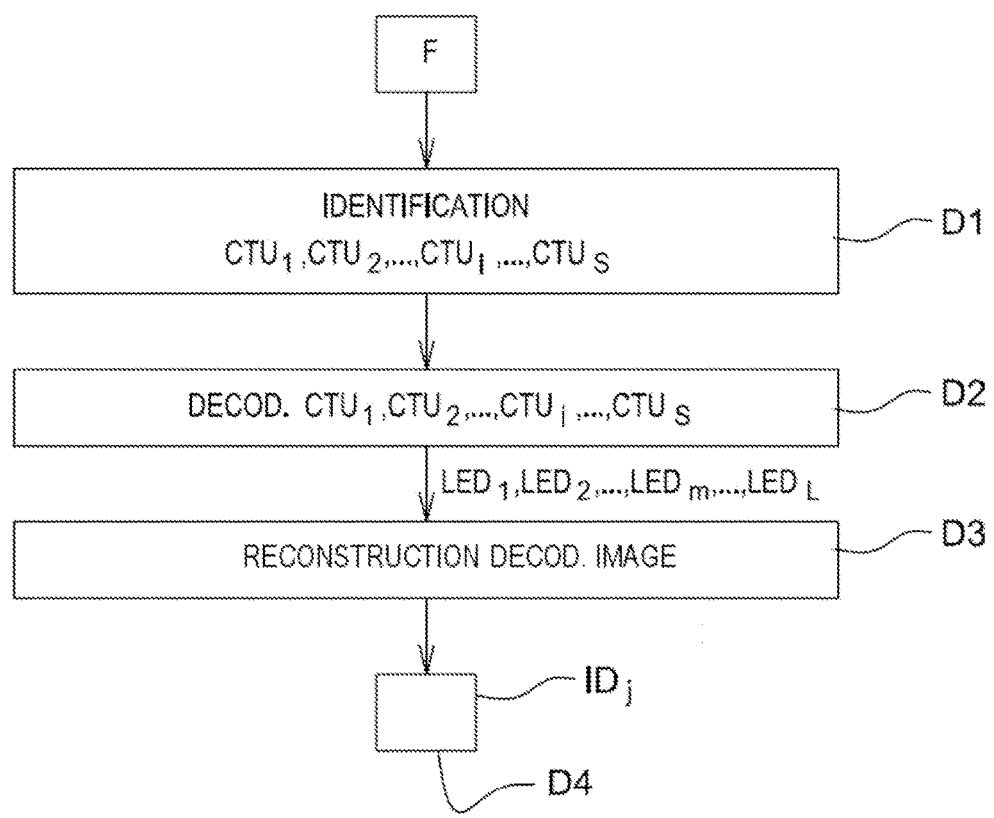
FIG. 6A shows the main steps of the decoding method according to the invention.

The decoding method shown in FIG. 6A applies to any current image in a sequence SQ of images to be decoded.

To that end, information representing the current image $IC_j$ be decoded is identified in the stream F received at the decoder.

With reference to FIG. 6A, the first decoding step D1 is the identification, in said stream F, of the blocks $CTU_1$, $CTU_2$, ..., $CTU_i$, ..., $CTU_S$ previously coded in accordance with the route PRS shown in FIG. 4.

With reference to FIG. 6A, the second decoding step D2 is the decoding of each of said L subsets $LE_1$, $LE_2$, ..., $LE_m$, ..., $LE_L$ of blocks, the blocks of a considered subset being capable of being decoded according to the predetermined sequential route order PRS, as shown in FIG. 4. In the example shown in FIG. 4, the blocks of a current subset LEm are decoded one after the other, from left to right, as indicated by the arrow PRS. At the conclusion of step D2, the subsets of decoded blocks $LED_1$, $LED_2$, ..., $LEDm$, ..., $LED_L$ are obtained.

Such decoding is of sequential type and, consequently, is performed using a single decoding module UDO as shown in FIG. 7A, said module being controlled by the microprocessor µP of the processing unit UT_DO. In a manner that is known as such, the buffer memory MT_DO of the decoder DO is suited to containing the symbol appearance probabilities as progressively updated in the course of the decoding of a current block.

Figure 7B:
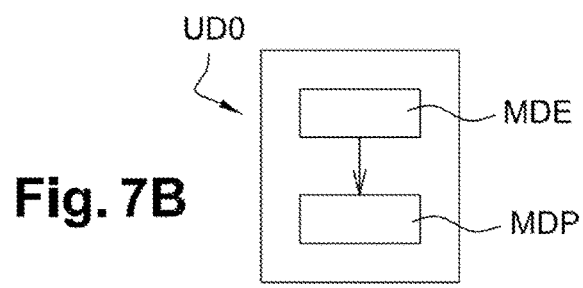
FIG. 7B shows a decoding module of the decoding device of FIG. 7A.

As shown in more detail in FIG. 7B, the decoding module UDO comprises:
- a module for entropy decoding of said current block by virtue of the learning of at least one symbol appearance probability calculated for at least one previously decoded block, denoted MDE,
- a module for predictive decoding of a current block in relation to said previously decoded block, denoted MDP.

The predictive decoding module MDP is capable of performing predictive decoding of the current block, using conventional prediction techniques, such as in intra and/or inter mode.

The entropy decoding module MDE, for its part, is of CABAC type but modified according to the present invention as will be described further on in the description.

As a variant, the entropy decoding module MDE could be a Huffman decoder that is known as such.

In the example shown in FIG. 4, the UCO module decodes the blocks in the first line $LE_1$, from left to right. When it gets to the last block in the first line $LE_1$, it moves to the first block in the second line $LE_2$. When it gets to the last block in the second line $LE_2$, it moves to the first block in the third line $LE_3$. When it gets to the last block in the third line $LE_3$, it moves to the first block in the fourth line $LE_4$, and so on until the last block of the current image $IC_j$ is decoded.

Other types of routes than the one that has just been described above are of course possible. Thus, it is possible to chop the image $IC_j$ into a plurality of subimages called slices and to independently apply chopping of this type to each subimage. It is likewise possible for the decoding module UCO to process not a succession of lines as explained above but rather a succession of columns. It is likewise possible to run through the lines or columns in one direction or in the other.

With reference to FIG. 6A, the third decoding step D3 is the reconstruction of a decoded image $ID_j$ on the basis of each decoded subset $LED_1$, $LED_2$, ..., $LED_m$, ..., $LED_L$ obtained in the decoding step D2. More precisely, the decoded blocks of each decoded subset $LED_1$, $LED_2$, ..., $LED_m$, ..., $LED_L$ are transmitted to an image reconstruction unit URI as shown in FIG. 7A, said unit being controlled by the microprocessor µP of the processing unit UT_DO. In the course of this step D3, the unit URI writes the decoded blocks to a decoded image as these blocks become available.

In the course of a fourth decoding step D4 that is shown in FIG. 6A, an entirely decoded image $ID_j$ is delivered by the unit URI shown in FIG. 7A.

A description will now be given, with reference to FIG. 6B, of the various specific substeps of the invention, as implemented in the aforementioned step D2 of sequential decoding, in the decoding module UDO shown in FIGS. 7A and 7B.

Figure 6B:
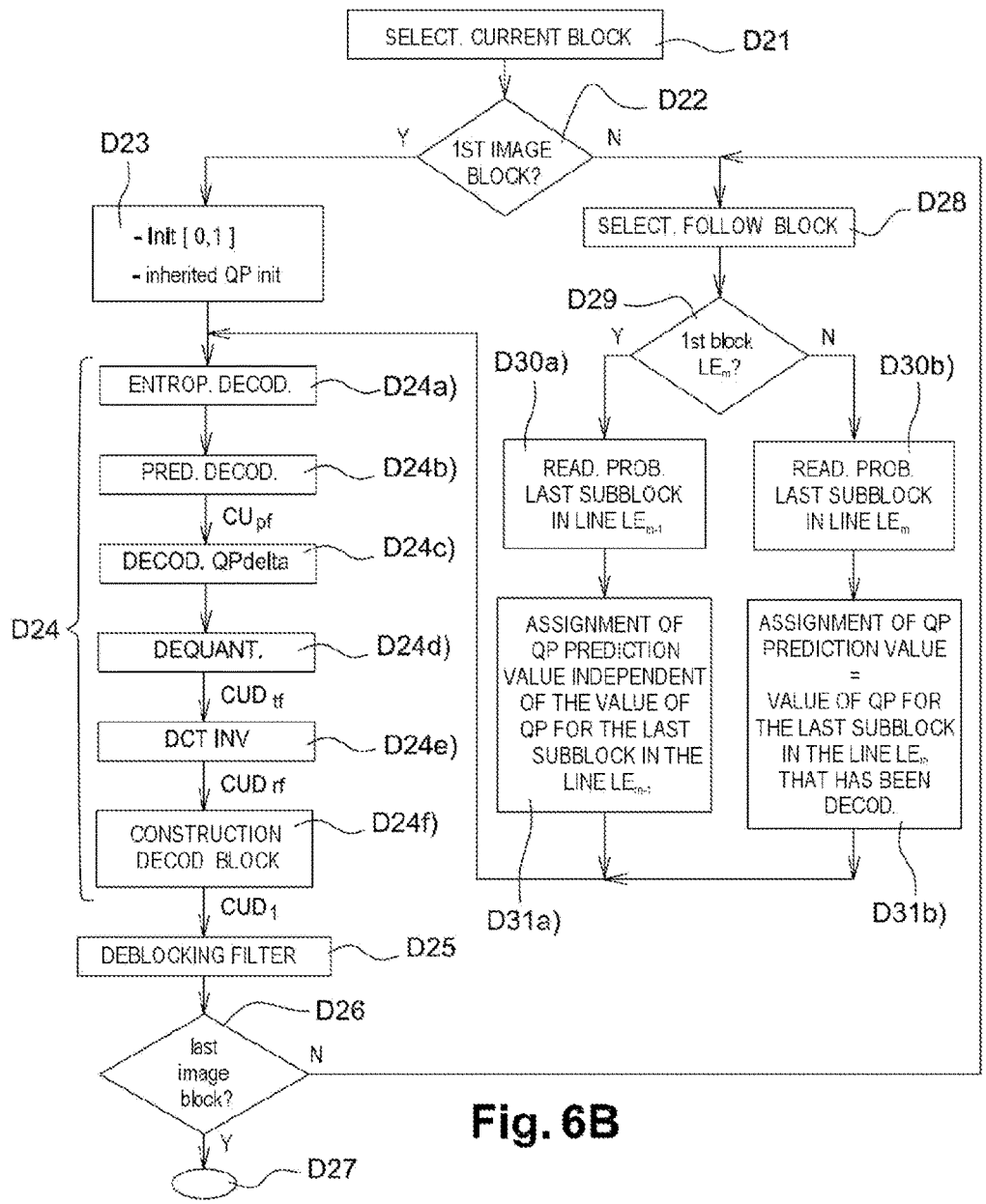
FIG. 6B shows a detailed view of the decoding implemented in the decoding method of FIG. 6A.

In the course of a step D21 that is shown in FIG. 6B, the decoding module UDO selects as the current block the first subblock to be decoded from a block $CTU_i$ in a current line $LE_m$ that is shown in FIG. 4, such as the first line $LE_1$. In the remainder of the description, this subblock will be called a block.

In the course of a step D22 that is shown in FIG. 6B, the decoding module UDO tests whether the current block is the first block (situated at the top and on the left) of the image $IC_j$ that has previously been coded.

If this is the case, in the course of a step D23 that is shown in FIG. 6B, the entropy decoding module MDE initializes the symbol appearance probabilities. Such initialization is identical to that performed for the coding in step C33 that is shown in FIG. 2B.

In the course of this same step D23 that is shown in FIG. 6B, the method involves the initialization of a predicted compression parameter value. In the example shown, the considered compression parameter is the quantification parameter QP. In accordance with the HEVC standard, the predicted QP parameter value is initialized to the value QPslice.

If, following the aforementioned step D22, the current block is not the first block of the image $IC_j$, a test is performed, in the course of a step D29 that will be described subsequently in the remainder of the description, to determine whether the current block is the first block in the considered line $LE_m$.

In the course of a step D24 that is shown in FIG. 6B, the method involves the decoding of the first current block $CU_1$ in the first line $LE_1$, as shown in FIG. 4. Such a step D24 comprises a plurality of substeps D24a) to D24f) that will be described below.

In the course of a first substep D24a) that is shown in FIG. 6B, the entropy decoding module MDE of FIG. 7B entropically decodes the syntax elements linked to the current block. Such a step basically involves:
 a) reading the bits contained in the stream that are associated with said first line $LE_1$,
 b) reconstructing the symbols on the basis of the read bits.

More precisely, the syntax elements linked to the current block are decoded by the CABAC entropy decoding module MDE as shown in FIG. 7B. The latter decodes the stream of bits F from the compressed file in order to produce the syntax elements and, at the same time, reupdates its probabilities so that, at the moment at which it decodes a symbol, the probabilities of appearance of this symbol are identical to those obtained during coding of that very symbol in the aforementioned entropy coding step C34g) shown in FIG. 2B.

In the course of a subsequent substep D24b) that is shown in FIG. 6B, the predictive decoding module MDP of FIG. 7B predictively decodes the current block $CU_1$ by means of known intra and/or inter prediction techniques, in the course of which the block $CU_1$ is predicted in relation to at least one previously decoded block.

It goes without saying that other modes of intra prediction as proposed in the HEVC standard are possible.

The current block $CU_1$ can likewise be subjected to predictive decoding in inter mode, in the course of which the current block is predicted in relation to a block from a previously decoded image. Other types of prediction are of course envisagable. Among the possible predictions for a current block, the best prediction is chosen in accordance with a rate-distortion criterion that is well known to a person skilled in the art.

Said aforementioned predictive decoding substep allows the construction of a predicted block $CUp_1$ that is an approximation of the current block $CU_1$.

In the course of a subsequent substep D24c) that is shown in FIG. 6B, if the current transform block $Tu_n$ is the first transform block of the current block $CTU_j$ that contains a residue (CBF=1), such as the block $TU_1$ in FIG. 5, the method involves the decoding of the syntax element QP delta and the value of the parameter QP of the current subblock is calculated by adding the decoded syntax element QPdelta to the value of the parameter QP of the previously decoded subblock, called "predicted QP".

In the course of a subsequent substep D24d) that is shown in FIG. 6B, the method involves the dequantification of the quantified block $CUq_1$ using a conventional dequantification operation that is the inverse operation of the quantification performed in the aforementioned step C34e) that is shown in FIG. 2B, in order to produce a decoded dequantified block $CUDt_1$.

In the course of a subsequent substep D24e) that is shown in FIG. 6B, the method involves the inverse transformation of the dequantified block $CUDt_1$ that is the inverse operation of the direct transformation performed in the aforementioned step C34d) that is shown in FIG. 2B. A decoded residue block $CUDr_1$ is then obtained.

In the course of a subsequent substep D24f) that is shown in FIG. 6B, the method involves the construction of the decoded block $CUD_1$ by adding to the predicted block $CUp_1$ the decoded residue block $CUDr_1$. The decoded bock $CUD_1$ is then made available for use by the decoding module UDO shown in FIGS. 7A and 7B.

At the conclusion of the aforementioned decoding step D24, the entropy decoding module MDE as shown in FIG. 7B contains all the probabilities as progressively reupdated in the course of the decoding of the first block. These probabilities correspond to the various possible syntax elements and to the various associated decoding contexts.

In the course of a subsequent step D25 that is shown in FIG. 6B, the decoded block $CUD_1$ is filtered by means of a deblocking filter in compliance with the HEVC standard. In particular, the deblocking filter uses the quantification parameter QP of the current transform block $TU_n$ in order to determine the filtering force that should be applied.

In the course of a subsequent step D26 that is shown in FIG. 6B, the decoding module UDO tests whether the current block $CUD_1$ that has just been decoded is the last block contained in the stream F.

If this is the case, in the course of a step D27 that is shown in FIG. 6B, the decoding method is terminated.

If this is not the case, the method involves, in the course of step D28 that is shown in FIG. 6B, the selection of the subsequent block $CU_f$ to be decoded in accordance with the route order shown by the arrow PRS in FIG. 4.

In the course of a subsequent step D29 that is shown in FIG. 6B, a test is performed to determine whether the current block is the first block in the considered line $LE_m$.

If this is the case, in the course of a step D30a) of entropy decoding, the entropy decoding module MDE of FIG. 7B starts to decode the first current block in the considered line $LE_m$ with the symbol appearance probabilities calculated at the conclusion of the decoding of the last subblock of the last block $CTU_d$ ($1 \le d \le S$) in the preceding line $LE_{m-1}$.

With reference to FIG. 6B, in the course of a step D31a) of predictive decoding of a compression parameter associated with said first current block, such as the quantification parameter QP, the predictive decoding module MDP of FIG. 7B assigns a compression parameter prediction value that is independent of the value of the compression parameter associated with said last subblock of the last block $CTU_d$ ($1 \le d \le S$) in the preceding line $LE_{m-1}$.

According to a first variant of step D31a), the assigned prediction value for the quantification parameter QP is that of the quantification parameter associated with the last subblock of the first block CTU in the preceding line $LE_{m-1}$. With reference to FIG. 4, if the current block is the first subblock of the block $CTU_{17}$ in the third line $LE_3$, for example, the assigned prediction value for the quantification parameter QP is that of the quantification parameter associated with the last subblock of the first block $CTU_9$ in the second line $LE_2$.

According to a second variant of step D31a), the assigned prediction value for the quantification parameter QP is that of the quantification parameter associated with the last subblock of the second block CTU in the preceding line $LE_{m-1}$. With reference to FIG. 4, if the current block is the first subblock of the block $CTU_{17}$ in the third line $LE_3$, for example, the assigned prediction value for the quantification parameter QP is that of the quantification parameter associated with the last subblock of the second block $CTU_{10}$ in the second line $LE_2$.

According to a third variant of step D31a), the assigned prediction value for the quantification parameter QP is that of the quantification parameter associated with the first subblock of the first block CTU of the image $IC_j$. With reference to FIG. 4, if the current block is the first subblock of the block $CTU_{17}$ in the third line $LE_3$, for example, the assigned prediction value for the quantification parameter QP is that of the quantification parameter associated with the first subblock of the first block $CTU_1$ in the first line $LE_1$.

According to a fourth variant of step D31a), if the image $IC_1$ has been chopped into a plurality of slices, the prediction value assigned to the first current block for the quantification parameter QP is the value QPslice of the slice that contains said first current block.

Following step D31a), the current block is decoded by virtue of iteration of steps D24 to D27 that are described above.

If, following the aforementioned step D29, the current block is not the first block in the considered line $LE_m$, the method involves, in the course of a step D30b) of entropy decoding that is shown in FIG. 6B, the reading of the probabilities from the last previously decoded subblock that is on the same line $LE_m$ as the current block to be decoded, that is to say the last decoded subblock of the block CTU that is situated immediately to the left of the current block. Such a step is implemented by the entropy decoding module MDE shown in FIG. 7B.

With reference to FIG. 6B, the method then involves, in the course of a step D31b) of predictive decoding of a compression parameter associated with said current block, such as the quantification parameter QP, the assignment of a QP parameter prediction value to the value of the parameter QP of the last previously decoded subblock that is on the same line $LE_m$ as the current block to be decoded, that is to say the last decoded subblock of the block CTU that is situated immediately to the left of the current block. Such a step is implemented by the predictive decoding module MDP shown in FIG. 7B.

Following step D31b), the current block is decoded by virtue of iteration of steps D24 to D27 that are described above.

The decoding steps that have just been described above are implemented by all blocks $CTU_1, CTU_2, \ldots, CTU_i, \ldots, CTU_S$ to be decoded in the current considered image $IC_j$.

It goes without saying that the embodiments that have been described above have been provided purely by way of indication and without any limitation whatsoever, and that numerous modifications can easily be made by a person skilled in the art without necessarily departing from the scope of the invention.

The invention claimed is:

1. A method for coding at least one image comprising the steps of:
   partitioning of the image into a plurality of blocks that are capable of containing symbols belonging to a predetermined set of symbols,
   entropy coding of a current block on the basis of at least one symbol appearance probability,
   predictive coding of a compression parameter associated with said current block, said coding method being characterized in that when the current block is a first block to be coded in a line of consecutive blocks to be coded and when said current block is different from the first block of the image, the method involves the steps of:
      determination, during said step of entropy coding, of symbol appearance probabilities for said first current block, said probabilities being those that are determined at the conclusion of the coding and then the decoding of a last block of a line of consecutive blocks that immediately precedes, in the order of coding of the blocks, said considered line,
      assignment, during said step of predictive coding of a compression parameter associated with said first current block, of a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image.

2. A coding device for at least one image, which coding device is intended to implement a coding method comprising the steps of:
   partitioning of the image into a plurality of blocks that are capable of containing symbols belonging to a predetermined set of symbols,
   entropy coding of a current block on the basis of at least one symbol appearance probability,
   predictive coding of a compression parameter associated with said current block, said coding method being characterized in that when the current block is a first block to be coded in a considered line of consecutive blocks to be coded and when said current block is different from the first block of the image, the method involves the steps of:
      determination, during said step of entropy coding, of symbol appearance probabilities for said first current block, said probabilities being those that are determined at the conclusion of the coding and then the decoding of a last block of a line of consecutive blocks that immediately precedes, in the order of coding of the blocks, said considered line,
      assignment, during said step of predictive coding of a compression parameter associated with said first current block, of a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image,
   said device comprising:
   means for partitioning the image into a plurality of blocks that are capable of containing symbols belonging to a predetermined set of symbols,
   means for entropy coding of a current block on the basis of at least one symbol appearance probability,
   means for predictive coding of a compression parameter associated with said current block,
   said coding device being characterized in that if the current block is a first block to be coded in a considered line of consecutive blocks to be coded then:
      the entropy coding means determine symbol appearance probabilities for said first current block, said probabilities being those that have been determined at the conclusion of the coding and then the decoding of a last block of a line of consecutive blocks that immediately precedes, in the order of coding of the blocks, said considered line,
      the means for predictive coding of a compression parameter associated with said first current block assign a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image.

3. A method for decoding a stream that is representative of at least one coded image, comprising the steps of:
identification, in said stream, of a plurality of coded blocks, said blocks being capable of containing symbols belonging to a predetermined set of symbols,
entropy decoding of a current coded block on the basis of at least one symbol appearance probability,
predictive decoding of a compression parameter associated with said current coded block,
said decoding method being characterized in that when the current block is a first block to be decoded in a considered line of consecutive blocks to be decoded and when said current block is different from the first block of the image, the method involves the steps of:
  determination, during said step of entropy decoding, of symbol appearance probabilities for said first current block, said probabilities being those that have been determined at the conclusion of the decoding of a last block of a line of consecutive blocks that immediately precedes, in the order of coding of the blocks, said considered line,
  assignment, during said step of predictive decoding of a compression parameter associated with said first current block, of a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image.

4. A device for decoding a stream that is representative of at least one coded image, which decoding device is intended to implement a decoding method comprising the steps of:
identification, in said stream, of a plurality of coded blocks, said blocks being capable of containing symbols belonging to a predetermined set of symbols,
entropy decoding of a current coded block on the basis of at least one symbol appearance probability,
predictive decoding of a compression parameter associated with said current coded block,
said decoding method being characterized in that when the current block is a first block to be decoded in a considered line of consecutive blocks to be decoded and when said current block is different from the first block of the image, the method involves the steps of:
  determination, during said step of entropy decoding, of symbol appearance probabilities for said first current block, said probabilities being those that have been determined at the conclusion of the decoding of a last block of a line of consecutive blocks that immediately precedes, in the order of coding of the blocks, said considered line,
  assignment, during said step of predictive decoding of a compression parameter associated with said first current block, of a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image;
said device comprising:
means for identification, in said stream, of a plurality of coded blocks, said blocks being capable of containing symbols belonging to a predetermined set of symbols,
means for entropy decoding of a current coded block on the basis of at least one symbol appearance probability,
means for predictive decoding of a compression parameter associated with said current coded block,
said decoding device being characterized in that if the current block is a first block to be decoded in a considered set of consecutive blocks to be decoded then
  the means for entropy decoding determine symbol appearance probabilities for said first current block, said probabilities being those that have been determined at the conclusion of the decoding of a last block of a line of consecutive blocks that immediately precedes, in the order of coding of the blocks, said considered line,
  the means for predictive decoding of a compression parameter associated with said first current block assign a compression parameter prediction value that is the value of a compression parameter associated with a last subblock of a first block or a second block of said other line that immediately precedes, in the order of coding of the blocks, said considered line, or the value of a compression parameter associated with a first subblock of a first block of the image.

* * * * *